United States Patent [19]

Burnett et al.

[11] 4,154,335

[45] May 15, 1979

[54] CONVEYOR BELTING AND METHOD OF MANUFACTURE

[75] Inventors: Edward J. Burnett, Orchard Park; Richard A. Miller, Williamsville, both of N.Y.

[73] Assignee: Albany International Corp., Albany, N.Y.

[21] Appl. No.: 848,749

[22] Filed: Nov. 4, 1977

[51] Int. Cl.² ............................................. B29H 7/22
[52] U.S. Cl. .................................... 198/847; 156/148; 428/234; 428/235; 428/246; 428/252; 428/253; 428/295; 428/300
[58] Field of Search ............... 428/234, 235, 252, 253, 428/254, 255, 287, 295, 301, 300, 233, 246; 156/1-18, 137; 74/231 R, 234, 237; 198/847

[56] References Cited

U.S. PATENT DOCUMENTS

| 3,122,934 | 3/1964 | Fihe | 156/137 |
| 3,570,085 | 3/1971 | Heinemann | 428/235 |
| 3,817,820 | 6/1974 | Smith | 428/295 |
| 3,940,532 | 2/1976 | Smith | 428/300 |

Primary Examiner—James J. Bell
Attorney, Agent, or Firm—Kane, Dalsimer, Kane, Sullivan and Kurucz

[57] ABSTRACT

The disclosure is of conveyor belting and a method for its manufacture. The belting comprises a plurality of substantially parallel textile yarns of a specific character, integrated with a layer of consolidated staple fibers and encapsulated in a matrix of a specific class of elastomeric resin. The belting of the invention is useful to manufacture conveyor belts which exhibit advantageous properties of wear resistance, stability in running and structural integrity.

21 Claims, 1 Drawing Figure

CONVEYOR BELTING AND METHOD OF MANUFACTURE

BACKGROUND OF THE INVENTION

1. Field of the Invention

The invention relates to conveyor belting and to methods of its manufacture.

2. Brief Description of the Prior Art

A review of the prior art is contained in Man Made Textile Encyclopedia, pages 309–312. In general, textile based conveyor belting is made by the so-called "wet-woven PVC" method wherein polyester warp yarns are immersed in polyvinyl chloride and then woven together while wet. Alternatively, belting may be made by lamination of textile cloths with elastomeric sheets. The resultant belting is not entirely satisfactory for all purposes. For example, the laminated belts are subject to delamination and structural failure over periods of use.

The method and belting of our invention represent improvements in the art. The method of manufacture is economical, efficient and produces an advantageous product. The belting of the invention is useful in the manufacture of conveyor belts which exhibit advantageous properties of resistance to abrasion (particularly on the edges), flexibility, structural and running stability. The belting of the invention obviates the prior art problem of delamination.

SUMMARY OF THE INVENTION

The invention comprises a conveyor belting, which comprises;

a plurality of substantially parallel textile yarns characterized by their high tensile strength, low stretch and uniformity of shrink;

a layer of fibrous material in the form of discrete staple fibers, said layer being consolidated through entanglement of the individual fibers and integrated with said yarns by entanglement of the fibers therewith, said entanglements being of the characters produced by a needling operation; and a matrix of a synthetic, polymeric, non-cellular, elastomeric resin substantially encapsulating the layer, individual fibers thereof and the integrated yarns.

The invention also comprises a method of manufacturing a belting; which comprises;

providing a plurality of substantially parallel textile yarns characterized by their high tensile strength, low stretch and uniformity of shrink;

needling to said yarns a bat of discrete staple fibers;

heat setting the needled material; saturating the heat set material with a liquid non-cellular elastomer forming, synthetic, polymeric resin; and curing the resin saturant under heat and pressure.

The invention also comprises conveyor belts made from the belting of the invention and the use of the belting in conveyor belt applications.

BRIEF DESCRIPTION OF THE DRAWING

The FIGURE is a cross-sectional, side elevation of a portion of an embodiment belting of the invention.

DETAILED DESCRIPTION OF THE PREFERRED EMBODIMENTS OF THE INVENTION

Figure 1:
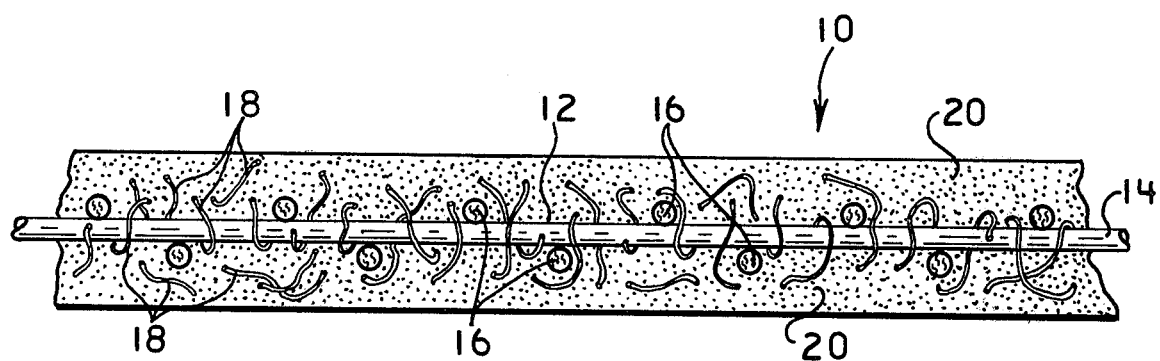

In carrying out the method of the invention, the textile yarns may be provided incorporated in a cloth. For example, the textile yarns provided may be in the form of lengthwise yarns in a woven cloth or its equivalent in a knitted cloth. This is not essential however, and the yarns may be provided in a substantially parallel warp array, wherein the yarns are independent of each other. The term "substantially parallel" as used herein means that the yarns, for the most part, do not cross over each other indiscriminately. The provided textile yarns require a relatively high tensile strength, i.e.; on the order of at least about 20 lbs./end.

Advantageously, the provided textile yarn will have low stretch properties, for example on the order of at least about 4 to 5 percent ($\frac{1}{8}$ nominal breaking load) to about 15 to 20 percent.

It is important that the yarns exhibit uniformity in their shrink characteristics, i.e., yarns of a high degree of shrinkability should not be mixed with yarns of a low degree of shrinkability to minimize buckling or cockling of the belting.

The provided yarns may be selected from a wide variety of synthetic yarns, such as polyester, polyamide and like yarns. Preferably the yarns will be spun yarns or the like having a tendency to absorb and hold resin forming liquids.

In one embodiment of the invention, the textile yarns are provided in an open weave scrim as lengthwise yarns. Any weave may be used, a plain weave being stable and advantageous. In this embodiment, the nature of the crosswise yarns is not critical and any conventional synthetic or natural fiber yarn can be used. Advantageously the denier of the yarns and the density of the weave is selected to provide a scrim weight of from about 4 to about 40 oz./square yard for optimum strength.

In the next step of the method of the invention, discrete staple fibers such as presented in a non-woven fibrous bat, are needled to the above-described textile yarns. The bats may be of randomly oriented staple fibers such as synthetic polyamide, polyester, polyolefin, acrylic and like fibers including blends thereof and natural fibers such as jute and blends thereof. Optionally if desired the fibers may be directionally oriented within the bats by methods known to the art.

The bats of staple fibers selected for needling to the textile yarns advantageously have a weight of from about 2 to about 20 oz./square yard. The staple fibers may have a wider denier range. The bats may be preneedled using conventional techniques to obtain some integrity of the fibers prior to needling the bat to the yarns.

In needling the fibrous bats to the yarns, there is formed a layer of consolidated staple fibers, which through entanglement with the yarns becomes integrated therewith. If fibrous bats are needled to only one side of the yarns, fibers are carried to the opposite side to produce a light "nap" on that side, incorporating the yarns. In another embodiment of the invention, fibrous bats are needled to both sides of the textile yarn, to produce a thicker needled fabric.

The techniques of needling fibrous bats to yarns and cloths woven or knitted from textile yarns are well known and details need not be recited here. The coarseness of the felting needles used, the barb configurations, number, size and other variables are dependent somewhat on the degree of openness between the textile yarns, so as to avoid rupture of the textile yarns. In general, we have found a No. 28 gauge needle, with the barbs oriented so as not to tear the lengthwise yarns, adequate for needling. The needling frame may be fitted with either high or low density needle boards, a 34 density board being illustrative. Needling is preferably carried out to produce a needled fabric having a weight within the range of from about 6 to about 90 oz./square yard.

Following needling, it is advantageous to calender those needled materials wherein further consolidation is desired, particularly in those embodiments where a bat was needled to one side of the yarns only. The calendering further compacts and consolidates the staple fibers to reduce fluid permeability of the needled fabric. This enhances the retention of the elastomer forming liquid received by the needled material in the saturation step. Generally, it is desirable to have a fabric for resin saturation, characterized by its ability to accept and retain the elastomeric liquid precursor until solidification occurs. If the needled fabric lacks this characteristic, calendering may be advantageous. Calendering is not generally necessary if fibrous bats have been needled to both sides of the textile yarns.

In the next step of the method of the invention, the needled and possibly calendered fabric is heat set in an oven to selectively shrink the fabric. During heat setting, the fabric may be tensioned in the lengthwise direction (along the axis of the textile yarns) under from 0.5 to 20 lbs. per inch or more of fabric width. This eliminates a large degree of stretching in the final product, and obviates wrinkles across the width and along the length of the belt product of the invention. Heat setting is carried out under temperatures dependent on the nature of the fibers and yarns employed in the needled fabric. Those skilled in the art will know which temperatures to select. For example, when all polyester components are employed, heat setting may be carried out at temperatures within the range of from about 300° F. to 420° F.

The heat set, needled material is then saturated with a liquid, non-cellular elastomer forming, synthetic, polymeric resin. This may be carried out by dipping the fabric material into the liquid resin. It will be appreciated that a single dipping may suffice for saturating some materials, while multiple dippings with intermittent squeezing or partial drying steps may be required to fully saturate dense fibrous layers in other needled fabrics.

A wide range of liquid resin saturants may be employed. Representative are the liquid precursors for polyurethane, polyvinyl chloride, neoprene, styrene-butadiene and like non-cellular polymeric resins. A particularly preferred liquid saturant are the liquid carboxylated acrylonitrile-butadiene copolymer latex resins. The acrylonitrile-butadiene copolymer elastomers formed from them are highly flexible, crack-resistant even at low temperatures and form strong bonds with the textile components of the fabrics of the invention. Liquid resins without carriers and or solvents may be used. However, the latex employing a water carrier is advantageous. Liquid saturants employing organic solvents and carriers can also be employed as those skilled in the art will appreciate.

Desirably, the saturation of the heat set and needled fabric will provide high loading of elastomer, substantially penetrating the textile fabric so as to encapsulate the consolidated layer, individual fibers and yarns. Advantageously voids in the textile fabric are filled with elastomer so that elastomer is distributed throughout the body of the final product. Advantageously the saturation is such that the belting of the invention will comprise cured elastomer matrix constituting from 50 to 500 percent, preferably 100 to 350 percent of the textile fabric component weight.

The last step in the method of the invention for preparing belt fabrics of the invention may be curing the resin saturant in-situ. Curing may be affected by any means appropriate for the polymer resin. For example, by heat for heat curable resins. Advantageously the saturated material is passed through a heated platen press at a temperature sufficient to cure the resin. Advantageously the saturated material is simultaneously pressed to produce a belting. Pressures of from about 50 to about 200 lbs./square inch are practical and illustrative of pressures which may be employed. Preferably the saturated fabric is pressed and cured under pressures of from about 90 to 130 lbs./square inch.

Referring now to FIG. 1, one may see an enlarged cross-sectional side elevation of an embodiment belting 10 of the invention, prepared by the above-described method of the invention. The belting 10 consists of a woven scrim 12 including lengthwise yarns 14 which are textile yarns as described above. Crosswise yarns 16 may be, for example spun polyester yarns. Integrated with scrim 12 in a distinct layer are a plurality of staple fibers 18 such as polyester fibers needled to the scrim 12 and consolidated thereby. In making the belting 10, bats of staple fibers were needled to upper and lower surfaces of scrim 12. This forms a dense, fibrous layer (for illustrative purposes, only a few fibers 18 have been shown in FIG. 1) entangled with scrim 12. The scrim 12 and entangled fibers 18 are completely encapsulated in a matrix of a polymeric elastomer 20. The belting 10 is free of voids, and there is a high degree of bonding between elastomer 20 and the fibers 18 and yarns 14, 16.

The following examples describe the manner and process of making and using the invention and set forth the best mode contemplated by the inventors of carrying out the invention, but are not to be construed as limiting.

EXAMPLE 1

A fabric is woven with a plain weave using 5000 denier Multiplex Dacron polyester (DuPont Type 97; average elongation percent [⅛ nominal breaking load] 8.4; break strength 59 lbs; dry heat shrinkage at 160° C. is 9.0 percent) in the lengthwise direction and 1150 denier spun polyester yarn in the crosswise direction. The cloth is composed of 11 ends per inch and 10 picks per inch and weighs 9 oz./square yard. The cloth is combined with a needled bat of 100 percent polyester fibers (non-woven) having fiber denier of 6 and staple length of 3 inches, weighing 4 oz./square yard in one pass through a needle loom. The needled fabric is calendered at 6 yards/minute to an average thickness of 0.070 inches and then heat set under moderate lengthwise tension by running at 9 feet per minute through a 90 foot long oven with a temperature of 320° F. in the initial zone, 350° F. in an intermediate zone, and 390° F. in the final zone. The heat set fabric is then saturated by dipping in a nitrile latex compound of the following composition:

|  | Parts by Weight Wet |
| --- | --- |
| 68-151 Latex* | 91.4 |
| Aqua Ammonia, 28% | 0.9 |
| 50% Butyl Zimate Slurry** | 0.2 |
| 68% Sulfur Dispersion | 0.3 |

-continued

|  | Parts by Weight Wet |
|---|---|
| 60% Zinc Oxide Dispersion | 2.1 |
| Black Pigment | 4.2 |
| Coagulant WS*** | 0.9 |
|  | 100.0 |

*A carboxylated acrylonitrile/butadiene copolymer latex; Tylac 68-151, Reichhold Chemicals, Inc., Bulletin TB-1.
**Zinc di-n-butyl dithiocarbamate.
***A polyether-polysiloxane, Mobay Chemical Co.

The saturated fabric is then dried by exposure to infra red lamps for 20 minutes and then dipped again in the same formulation latex compound and again dried by infra red lamps to a moisture content of approximately 5%.

The impregnated fabric is then pressed at 300° F. for 3 minutes at 120 psi in a flat, smooth platen hydraulic press to obtain a flexible belting product 0.75" thick weighing 57 oz./square yard and having an ultimate tensile strength of 800 lbs./inch of width and a 3% elongation at 100 lbs./inch of width. Taber abrasion weight loss after 1000 cycles is 0.7%. The product fabric is calculated to contain 40 oz./square yard of elastomer added in the saturation step.

EXAMPLE 2

A plain weave fabric having the same yarns as that in example 1 but composed of 17 ends/inch and weighing 14 oz./square yard is combined with two needled 100% polyester non-woven bats each weighing 6 oz./square yard by two passes through a needle loom. In the first pass, one bat is applied to one side of the fabric; and in the second pass, a bat is applied to the opposite side of the fabric. This fabric is then heat set under the same conditions described in Example 1.

The needled fabric described in this example is then saturated with the same nitrile latex described in Example 1 by dipping, followed by a 20 minute exposure to infra red lamps for drying, followed by a second dipping in the same latex compound and finally exposure to infra red lamps to dry to a moisture content of circa 5%. The impregnated fabric is then heated in a 300° F. flat smooth platen hydraulic press for approximately four minutes and then pressed for three minutes at 85 psi to obtain a flexible belting with the following properties:

| Thickness | 0.128" to 0.137" |
|---|---|
| Weight | 103.5 oz./square yard |
| Ultimate Tensile Strength | 1100 lbs./inch of width |
| Elongation | 1% at 47 lbs./inch load |
|  | 2% at 85 lbs./inch load |
|  | 3% at 118 lbs./inch load |
| Taber Abrasion | 0.40% weight loss after 1000 cycles |

Three 16" wide rolls of belting slit from this 600 ft. master roll may be used to equip 15 conveyors. The conveyors exhibit no problems with cold weather start-up; and several months after first use, field reports indicate that the belts perform well in all aspects.

Those skilled in the art will appreciate that many modifications may be made to the above-described preferred embodiments without departing from the spirit and the scope of the invention. For example, the belting of the invention may be coated with other materials to enhance their usefulness in selected areas. For example, the belting of the invention may be coated with polyurethane, polyvinyl chloride, polytetrafluoroethylene, silicone rubber, and like polymer coatings.

We claim:
1. A conveyor belting, which comprises;
   a plurality of substantially parallel, uncrimped textile yarns characterized by their high tensile strength, low stretch of at least about 4 to 5 percent (178 nominal breaking load) to about 15 to 20 percent and uniformity of shrink;
   a layer of fibrous material in the form of discrete staple fibers, said layer being consoldiated through entanglement of the individual fibers and integrated with said yarns by entanglement of the fibers therewith, said entanglements being of the character produced by a needling operation; and
   a matrix of a synethetic, polymeric, non-cellular, elastomeric resin substantially encapsulating the layer, individual fibers thereof and the intergrated yarns.
2. The belting of claim 1 where in said yarns are incorporated as yarns in a cloth.
3. The belting of clam 2 wherein said yarns are the lengthwise yarns of a knitted cloth.
4. The belting of claim 2 wherein said yarns are lengthwise yarns in a woven cloth.
5. The belting of claim 4 wherein said layer is produced by needling a bat of staple fibers to one side of said cloth.
6. The belting of claim 4 wherein said layer is produced by needling a bat of staple fibers to each side of said cloth.
7. The belting of claim 1 wherein said yarns are polyester.
8. The belting of claim 7 wherein said fibers are polyester.
9. The belting of claim 1 wherein said resin is an acrylonitrile-butadiene copolymer.
10. The belting of claim 1 wherein the matrix comprises from 50 to 500 percent by weight of the yarns and fibers.
11. A method of manufacturing a conveyor belting, which comprises;
    providing a plurality of substantially parallel textile yarns characterized by their high tensile strength, low stretch and uniformity of shrink;
    needling to said yarns a bat of discrete staple fibers;
    tensioning the needled fabric in the lengthwise direction (along the axis of the textile yarns) under a force of from 0.5 to 20 lbs. per inch or more of fabric width;
    heat setting needled material while it is under the tensioning;
    saturating the heat set material with a liquid, non-cellular elastomer forming, synthetic, polymeric resin; and
    curing the resin saturant.
12. The method of claim 11 wherein a bat of fibers is needled to each side of the yarns.
13. The method of claim 12 wherein the yarns are in a woven cloth.
14. The method of claim 11 wherein needling is on one side of the yarns and the needled fabric is then calendered to further consolidate the needled fabric.
15. The method of claim 11 wherein the yarns are held under tension while the needled material is heat set.
16. The method of claim 11 wherein saturating is carried out by dipping the heat set material in said liquid.

17. The method of claim 11 wherein said liquid is an aqueous latex and after saturation, the saturated material is dried to remove a portion of the water.

18. The method of claim 11 wherein said liquid is a mixture of said resin and a liquid carrier and the liquid is evaporated from the material before curing.

19. The method of claim 11 wherein the saturated material is dried and then cured.

20. The method of claim 11 wherein curing is effected by passing the saturated material through a heated platen press.

21. A conveyor belt manufactured from the belting of claim 1.

* * * * *

UNITED STATES PATENT AND TRADEMARK OFFICE
CERTIFICATE OF CORRECTION

PATENT NO. : 4,154,335
DATED : May 15, 1979
INVENTOR(S) : Edward J. Burnett and Richard A. Miller It is certified that error appears in the above-identified patent and that said Letters Patent are hereby corrected as shown below:

At Column 6, Claim 1, line 4, "178" should read -- 1/2 --

At Column 6, Claim 1, line 14, "synethetic" should read -- synthetic --

At Column 6, Claim 3, line 1, "clam" should read -- claim --

Signed and Sealed this

Ninth Day of October 1979

[SEAL]

Attest:

RUTH C. MASON
Attesting Officer

LUTRELLE F. PARKER
Acting Commissioner of Patents and Trademarks